United States Patent [19]

Elrod et al.

[11] Patent Number: 5,045,681

[45] Date of Patent: Sep. 3, 1991

[54] OPTOELECTRIC RIPPLE CARRY ADDER

[75] Inventors: Steven E. Elrod, Kent; R. Aaron Falk, Renton; Keith H. Hill, Bellevue, all of Wash.

[73] Assignee: The Boeing Company, Seattle, Wash.

[21] Appl. No.: 414,006

[22] Filed: Sep. 29, 1989

[51] Int. Cl.[5] ............................................. H01J 31/50
[52] U.S. Cl. .................................. 250/213 A; 377/102
[58] Field of Search ............... 250/213 A, 551, 208.2; 307/311; 364/837, 845, 846; 377/102

[56] References Cited

U.S. PATENT DOCUMENTS

| | | | |
|---|---|---|---|
| 3,321,631 | 5/1967 | Biard et al. | 250/551 |
| 3,348,064 | 10/1967 | Powlus | 307/88.5 |
| 3,413,480 | 11/1968 | Biard et al. | 250/551 |
| 3,655,988 | 4/1972 | Nakamura et al. | 250/211 J |
| 3,680,080 | 7/1972 | Maure | 250/213 A |
| 3,818,451 | 6/1974 | Coleman | 250/551 |
| 3,995,173 | 11/1976 | Sibley | 250/551 |
| 4,506,151 | 3/1985 | MacDonald et al. | 250/213 A |
| 4,546,244 | 10/1985 | Miller | 250/211 J |
| 4,689,793 | 8/1987 | Liu et al. | 307/311 |
| 4,731,528 | 3/1988 | Neumann et al. | 250/213 A |
| 4,760,249 | 7/1988 | Baskett | 250/213 A |
| 4,771,169 | 9/1988 | Boatmun | 250/213 A |
| 4,797,843 | 1/1989 | Falk et al. | 364/713 |

Primary Examiner—David C. Nelms
Attorney, Agent, or Firm—Foley & Lardner, Schwartz, Jeffery, Schwaab, Mack, Blumenthal & Evans

[57] ABSTRACT

The invention comprises a semiconductor substrate with a plurality of photoconductive elements. The photoconductive elements are connected to form a combinational logic ripple carry adder having only AND and OR logic gates. An optic substrate overlies the semiconductor substrate and directs light representing logic parameters onto the logic gates. The ripple carry adder has complementary inputs and complementary outputs to enable the use of only AND and OR gates.

25 Claims, 10 Drawing Sheets

OPTOELECTRIC RIPPLE CARRY ADDER

BACKGROUND OF THE INVENTION

1. Field of the Invention

This invention relates to ripple carry adders and particularly to such an adder realized through optoelectronic logic using only AND and OR gates.

2. Discussion of Related Art

There is a fundamental difference between optical circuits, in which the information carriers are photons, and electronic circuits, where the carriers are electrons. In the former case the carriers do not interact with each other, while in the latter they do. This means that in optical devices there exist interconnect possibilities that do not exist with electronic hardware, in particular, interconnected parallel architectures which permit digital arithmetic and logic operations to be performed in a completely parallel, single step process. After the inputs are switched on, the output appears in the time it takes a photon to transit the device. No faster computation time is possible.

Optoelectronic logic circuits have been suggested in the past. For example, MacDonald et al. U.S. Pat. No. 4,506,151 discloses logic circuits which employ photoresponsive field effect transistors to directly drive laser diodes to provide optical output signals in response to optical input signals. However, such known optoelectronic circuits suffer from the defect that electronic inverters are used. The use of inverters limits the depth of logic that can be obtained before a conversion back to optics is necessary.

SUMMARY OF THE INVENTION

An object of the present invention is to provide an optoelectric logic circuit using logic variables and their complements to allow a complete logic set to be produced from AND gates and OR gates followed by a single back conversion to optics. This permits a depth and complexity of logic which is limited primarily by signal to noise considerations.

Another object of the present invention is to provide a combinational logic circuit using photoconductive detectors with very low capacitance, large dynamic range and high speed.

Another object of the present invention is to provide a combinational logic circuit which uses photoconductive detectors employing bipolar currents so that the device operates at the same switching speed independent of the depth of the logic.

In accordance with the above and other objects, the present invention includes a semiconductor substrate, element defining structure for defining a plurality of photoconductive elements in the semiconductive substrate, connecting structure for connecting the photoconductive elements to form a ripple carry adder having complementary inputs, a sum output and complementary carry outputs, and light directing structure positioned above the semiconductor substrate for directing light representing logic parameters to the logic gates.

The element defining structure and the connecting structure may comprise a metallization layer over the semiconductor substrate. The light directing structure comprises an optical substrate having a plurality of waveguides over the metallization layer. The waveguides include scattering patches positioned over certain of the logic gates.

The element defining structure comprises a pair of spaced metal electrodes having interdigitated fingers. The metal electrodes are spaced by a distance of less than 5 microns.

The connecting structure connects a plurality of the photoconductive elements in series to form an AND gate. The connecting structure also connects a plurality of the photoconductive elements in parallel to form an OR gate. Alternatively, OR gates can be formed by providing multiple optical inputs to a single photoconductive element.

The complementary outputs may include paired light emitting elements.

BRIEF DESCRIPTION OF THE DRAWINGS

The invention will become more clearly understood from the detailed description below, with reference to the accompanying drawings, in which like reference numerals are used to indicate similar components throughout, and in which.

DETAILED DESCRIPTION OF THE PREFERRED EMBODIMENTS

Figure 1:
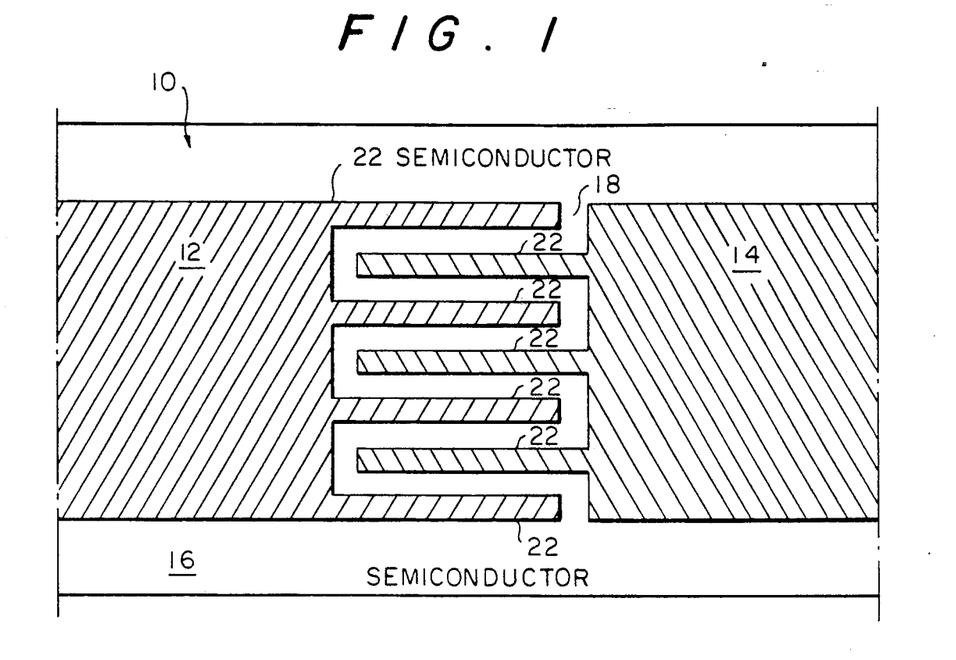
FIG. 1 is top plan view of one photodetector element according to the present invention.
Figure 2:
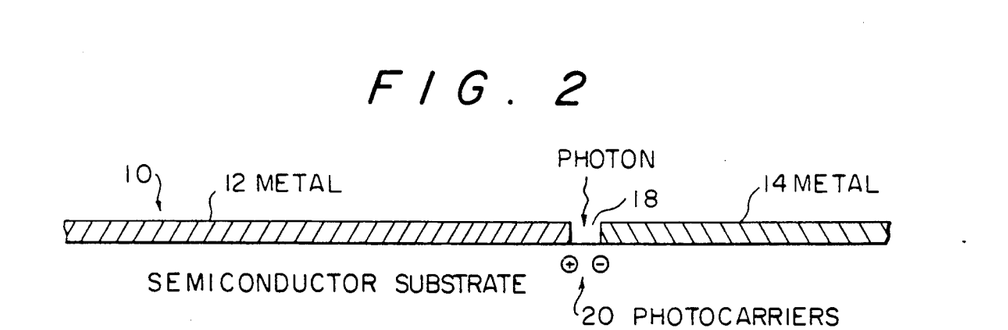
FIG. 2 is a cross sectional view of the photodetector element of FIG. 1.

One purpose of the present invention is to provide a highly efficient optoelectronic logic array. The basic building block for this array is shown in FIGS. 1 and 2. Shown here is a metal-semiconductor-metal (MSM) photoconductive detector 10. The detector 10 comprises metal electrodes 12 and 14 on the surface of a semiconductor substrate 16. Electrodes 12 and 14 can be formed of aluminum or any other suitable material. Substrate 16 can be silicon, germanium, gallium arsenide or any other suitable material. The electrodes 12 and 14 are spaced by a small gap 18, which can be on the order of a few microns. This gap is illuminated with light to produce electron-hole pairs, resulting in a bipolar current when the electrodes 12 and 14 are biased. In order to obtain a large collection area for the detectors, each electrode has a plurality of fingers 22 which are interdigitated.

MSM's have demonstrated switching speeds in the picosecond regime. And, these devices operate with bipolar current. These factors enable logic arrays to be produced in which each gate has the same switching speed independent of the depth of the logic and therefore allow the realization of logic arrays having a complexity limited primarily by signal-to-noise considerations. Furthermore, MSM's are relatively simple to fabricate. Consequently, as far as speed and simplicity of fabrication are concerned, MSM's are the best choice for optoelectronic logic arrays.

Figure 3:
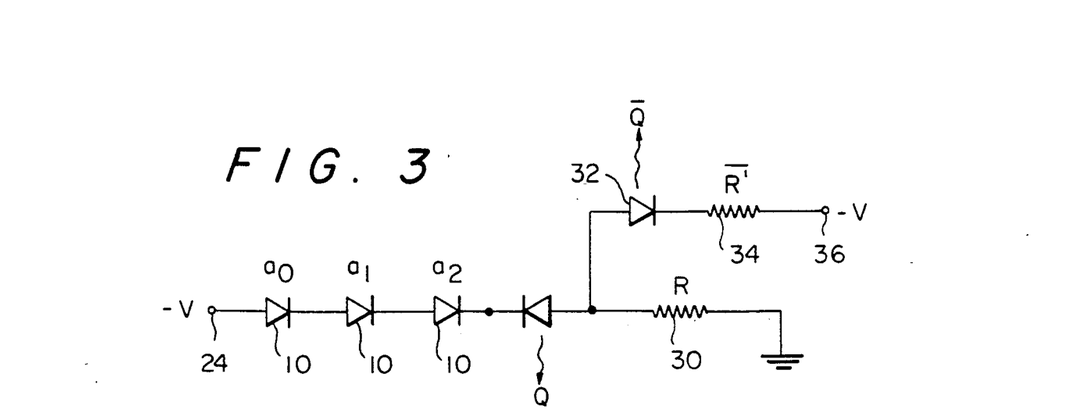
FIG. 3 is a schematic of a multiple input AND gate according to the present invention.

In order to use the detectors 10 shown in FIG. 1, they must be strung together in series or parallel circuits. FIG. 3 shows a series string of detectors 10. These detectors are illuminated by optical inputs a0, a1 and a2. The string will only have a low resistance when all the photoconductors in the string are illuminated and thereby constitutes a multi-input AND gate.

Figure 4:
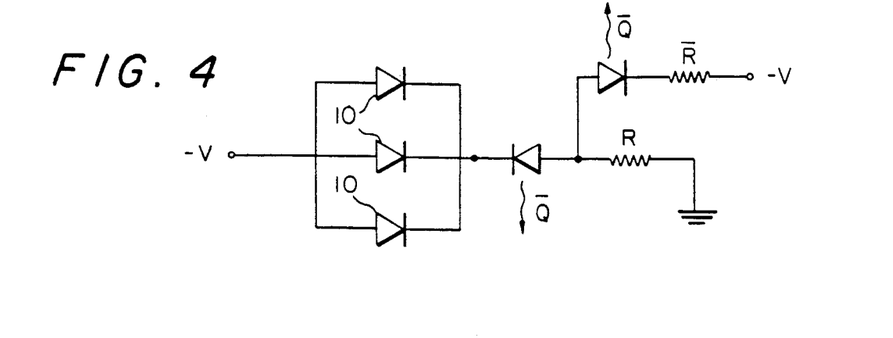
FIG. 4 is a schematic of a multiple input OR gate according to the present invention.

FIG. 4 shows a parallel set of three detectors 10 which will have a low conductance if any of the photoconductors is illuminated. This set, therefore, constitutes a multi-input OR gate. A multi-input OR gate can also be realized by directing multiple optical inputs to a single detector. The mixing of AND and OR gates results in combinational logic.

Figure 5:
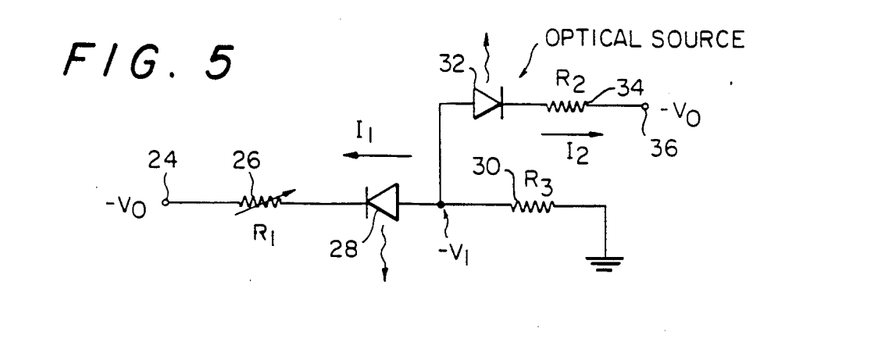
FIG. 5 is a schematic demonstrating the operation of a first embodiment of a complementary output used in the present invention.

As discussed above, one goal of the present invention is to perform combinational logic as rapidly as possible. This is in part achieved by using a minimum number of electrical switching elements which inherently require delay and limit the depth of permissible logic before a back conversion to light is required. In order to avoid switching circuits to provide an inverted parameter, complementary logic is used. In this manner, the complements of all parameters are available at all times. This requires that complementary inputs and outputs be used between the circuits. FIG. 5 shows one circuit for producing such complementary outputs and inputs.

The circuit of FIG. 5 includes a voltage source 24, a variable resistor 26, a first electrical to light conversion element 28 connected in series with the resistor 26, and a second resistor 30 connected between the electrical to light conversion element 28 and ground. A second electrical to light conversion element 32 is connected in series to a third resistor 34 between a voltage source 36 and the junction between resistor 30 and electrical to light conversion element 28. The electrical to light conversion elements can be LEDs, laser diodes, modulators, or any other suitable device as would be apparent to one skilled in the art. The voltage sources 24 and 36 have the same negative value relative to ground.

In operation, as the value of resistor 26 is varied, the values of currents I1 and I2 are also varied. With the value of resistor 26 being R1, the value of resistor 34 being R2 and the value of resistor 30 being R3, it will be understood that as R1 becomes much greater than R2 and R3, the current through conversion element 28, I1, will be reduced to zero and the current through conversion element 32, I2, will increase. Thus, conversion element 32 will illuminate and conversion element 28 will extinguish. Just the opposite is true if R1 becomes much smaller than R2 and R3. In this case, current I1 will increase, illuminating conversion element 28 and current I2 will go to zero, extinguishing conversion element 32.

Returning to FIG. 3, it will be understood that in the optoelectronic circuit of the present invention a combinational logic circuit comprising detectors 10 is substituted for the resistor 26. Thus, the illuminated states of the conversion elements 28 and 32 represent complementary outputs of the combinational logic.

Figure 6:
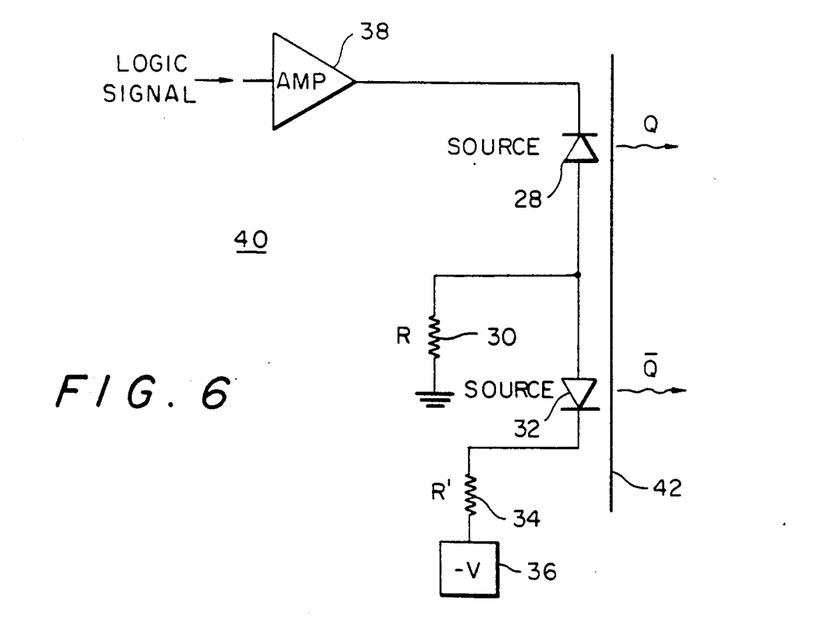
FIG. 6 is a schematic depicting an edge output used in the present invention.

FIG. 6 shows one possible orientation of the output for a logic circuit according to the invention. The circuit itself is represented by a logic signal supplied to an amplifier contained in an integrated circuit chip 40. This circuit must be interfaced with other chips containing other logic circuits, with busses, etc. As shown in FIG. 6, to conserve space the output from the electrical to optical conversion devices 28 and 32 is taken along the edge 42 of the chip 40 by placing the elements 28 and 32 adjacent to this edge. Clearly, the next circuit, buss, etc. could receive the signals along its edge also.

Figure 7:
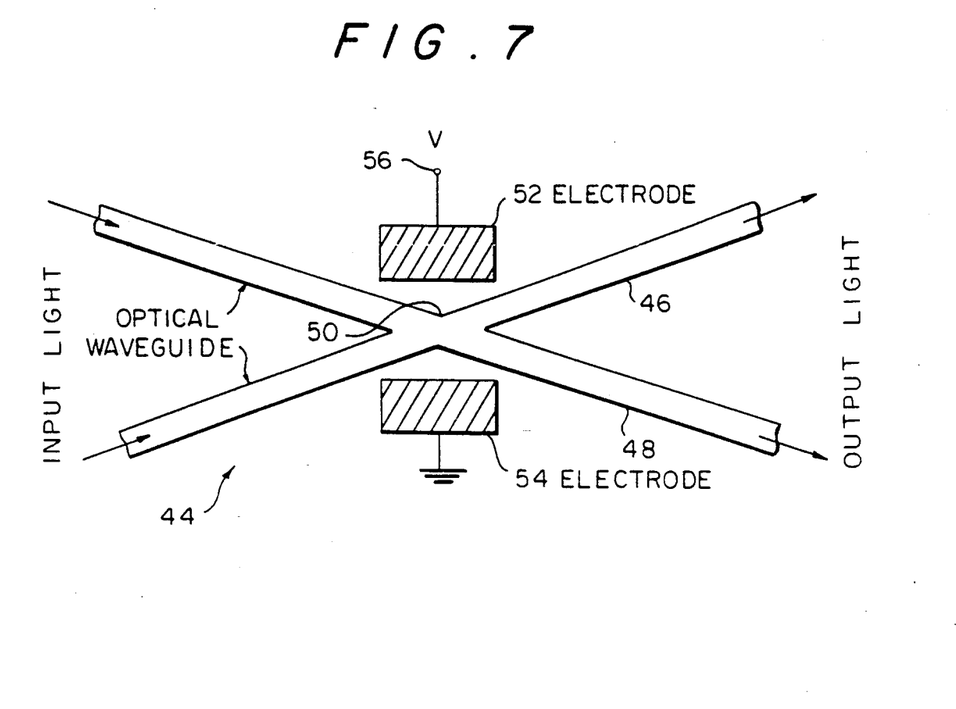
FIG. 7 is a schematic showing an optical switch which can be used to produce a complementary output.

FIG. 7 shows an alternative configuration for producing complementary outputs. This embodiment comprises an integrated electro-optic switch which can be either an X-crossing for single mode operation or a total internal reflectance (TIR) switch for multimode operation. Such switches are well known, per se. The embodiment shown in the drawings comprises a pair of waveguides 46 and 48 crossing at a junction 50. Electrodes 52 and 54 are positioned at the junction 50 and control the path of light input at one end of waveguide 48. Based on the input voltage 56 at electrode 52, electrode 54 being grounded, the light is output through waveguide 46 or waveguide 48. The input voltage 56 is the output of a combinational circuit so that the output from the waveguides 46 and 48 represent complementary outputs from the combinational logic.

Figure 8:
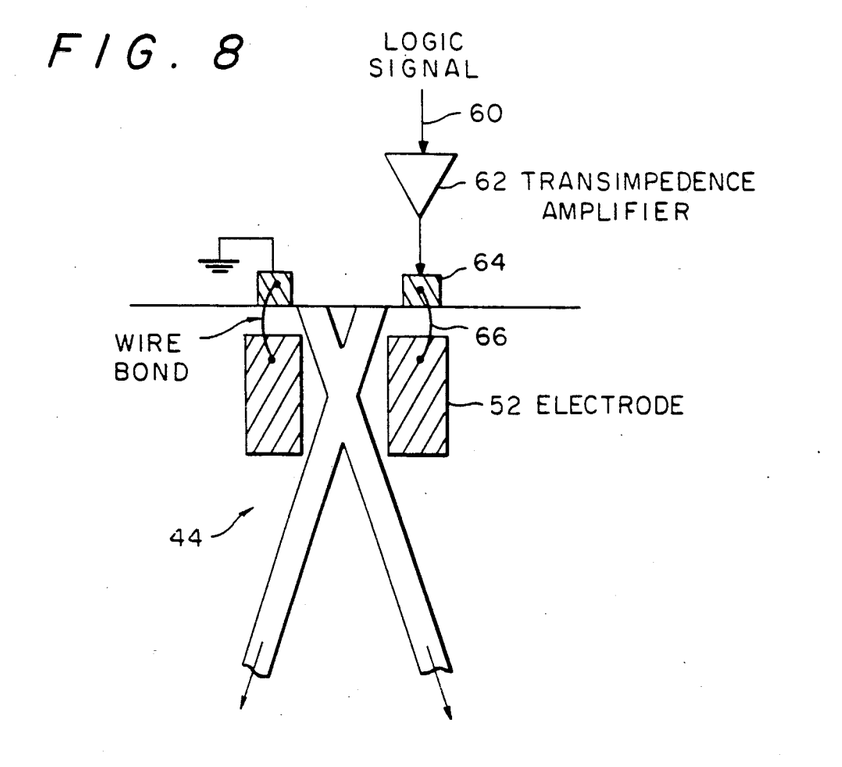
FIG. 8 is a schematic showing the interface of the optical switch of FIG. 7 with a logic circuit according to the present invention.

FIG. 8 shows one way to interface the switch 44 with a combinational logic circuit. The logic signal is transmitted along line 60 and this current signal is turned into a voltage signal in transimpedance amplifier 62. The signal is then passed through bonding pad 64 and wire bond 66 to electrode 52.

Figure 9:
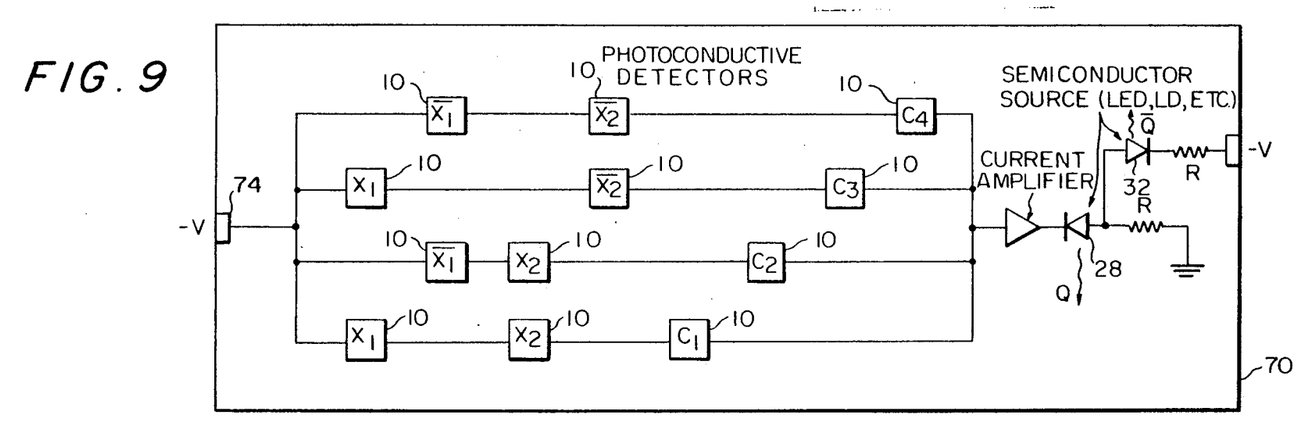
FIG. 9 is a schematic plan view of an optoelectronic substrate used in the present invention.
Figure 10:
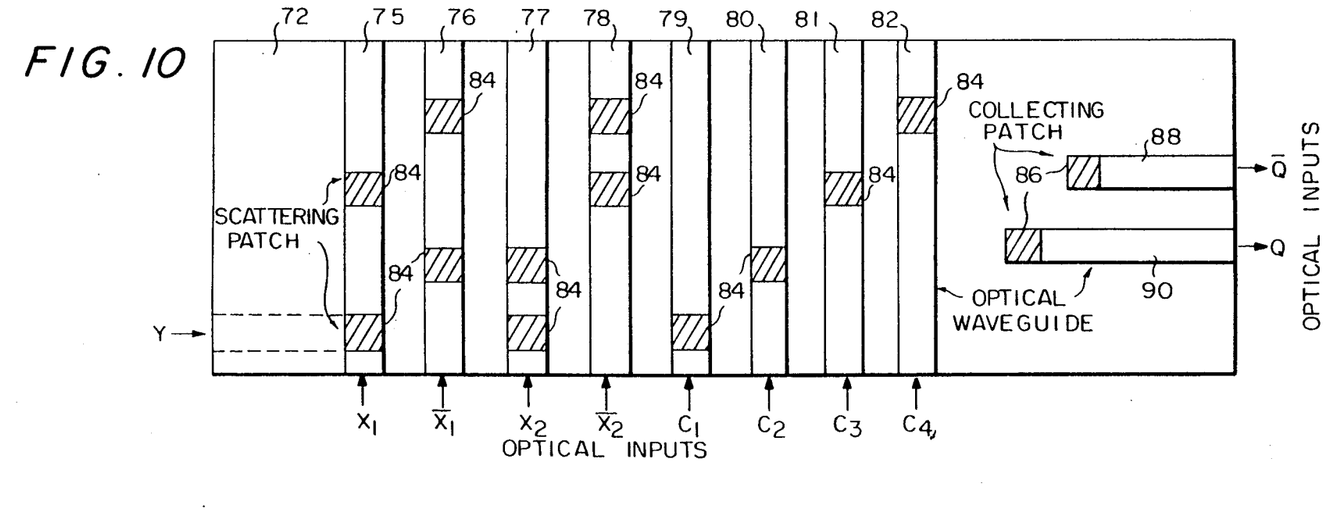
FIG. 10 is a schematic plan view of an optical substrate used in the present invention.

FIG. 9 shows an optoelectronic substrate 70 for the realization of a programmable boolean logic array according to the invention on a planar chip package. This substrate contains any sources, detectors and current amplifiers needed. FIG. 10 shows an optical substrate 72 which is positioned over the optoelectronic substrate 70 to form a complete logic array. This substrate contains waveguides and scattering patches for inputting light signals to the substrate 70, as will become apparent from the discussion below.

As seen in FIG. 9, the substrate 70 includes a bonding pad 74 connected to a voltage source providing a negative voltage to each of a plurality of parallel lines containing photoconductive detectors 10. Each detector 10 represents a different parameter as indicated on the drawing. For example, in the first line the first two series connected detectors represent the variables X1 and X2 and a third detector represents a control parameter C1. The control parameter C1 receives a control input to make the logic array programmable. In other words, if the first line is to be used in the logic array, an input is provided to control parameter C1. In like manner, the second line has a control parameter C2, the third line has a control parameter C3 and the fourth line has a control parameter C4. The output is taken through a complementary electrical to optical output circuit as described in FIG. 5 and FIG. 6.

As is apparent from FIG. 9, the variable parameters represented are X1, X2 and their complements. The four lines represent four possible combinations of these parameters. Such a substrate can be prepared for any number of variables and any combination of variables making full programmability possible. The lines are arranged in a linear (noncrossing) arrangement which allows for high speed microwave stripline type fabrication.

Optical inputs to photodetectors 10 are provided through the substrate 72 which has a plurality of optical waveguides 75-82. Each waveguide receives an optical signal representing one of the parameters X1, X2, their complements and each of the control parameters.

Each waveguide includes an optical scattering patch 84 positioned to input the appropriate light signal to the appropriate underlying photodetector 10. In other words, the two scattering patches 84 in the column representing the parameter X1 overly the photodetectors representing this same parameter. A similar situation holds for the scattering patches in the other columns and photodetectors representing the other parameters.

The operation of scattering patches in optoelectronic circuits is disclosed in U.S. patent application Ser. No. 07/219,276 filed July 15, 1988, the disclosure of which is incorporated herein by reference. A reversible form of scattering patch 86 allows coupling of the electrical to optical conversion devices 28 and 32 back into the optical substrate 72. Waveguides 88 and 90 then provide complementary optical output signals. If this type of arrangement is undesirable, the sources 28 and 32 can be positioned to emit from the side of the substrate, as discussed above relative to FIG. 6. Another alternative is the use of a transimpedance amplifier and a suitable integrated optical switch as discussed above in connection with FIGS. 7 and 8. This switch could be integrated into the optical substrate 72 and the electrodes could be connected to the optoelectronic substrate 70 using indium bump technology. Another alternative is to use a third substrate with wire bonds performing the electrical connections as shown in FIG. 8.

As mentioned above, an alternate realization of an OR gate comprises multiple light inputs directed to a single photoelectric element. This can be accomplished by directing multiple waveguides to the same scattering patch 84. An example of this technique is shown in phantom in FIG. 10 where a second input Y is directed to the same scattering patch 84 as input $X_1$, resulting in the Oring of X and Y.

Figure 11:
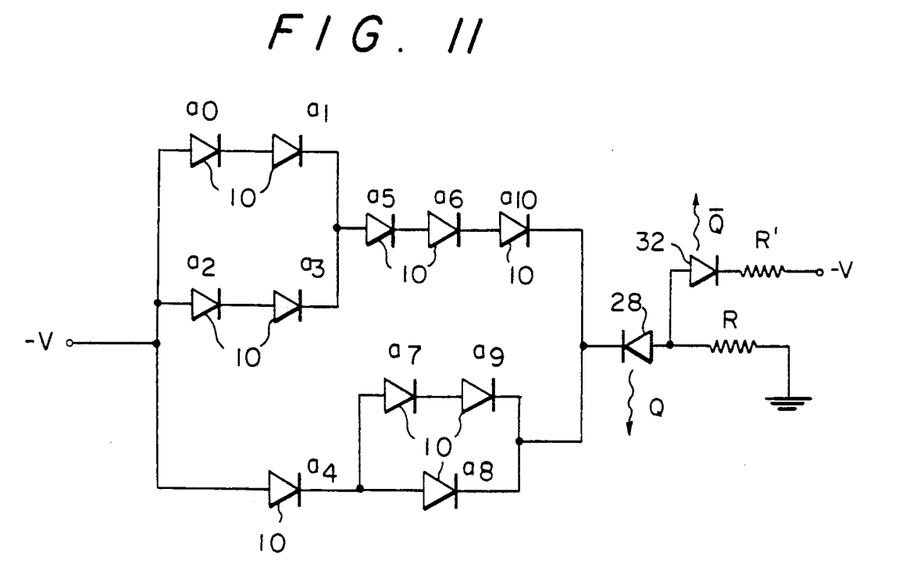
FIG. 11 is a schematic view of a multiple input optoelectronic combinational logic according to the present invention.

FIG. 11 is a schematic diagram of a particular logic circuit according to the present invention. This circuit is a realization of the logic function:

$$((a0\ a1+a2\ a3)\ (a5\ a6\ a10))+a4\ ((a7\ a9)+a8)$$

where a1-a10 indicate input parameters. As will be understood, the circuit of FIG. 11 can be formed using substrates similar to those in FIGS. 9 and 10.

Figure 12:
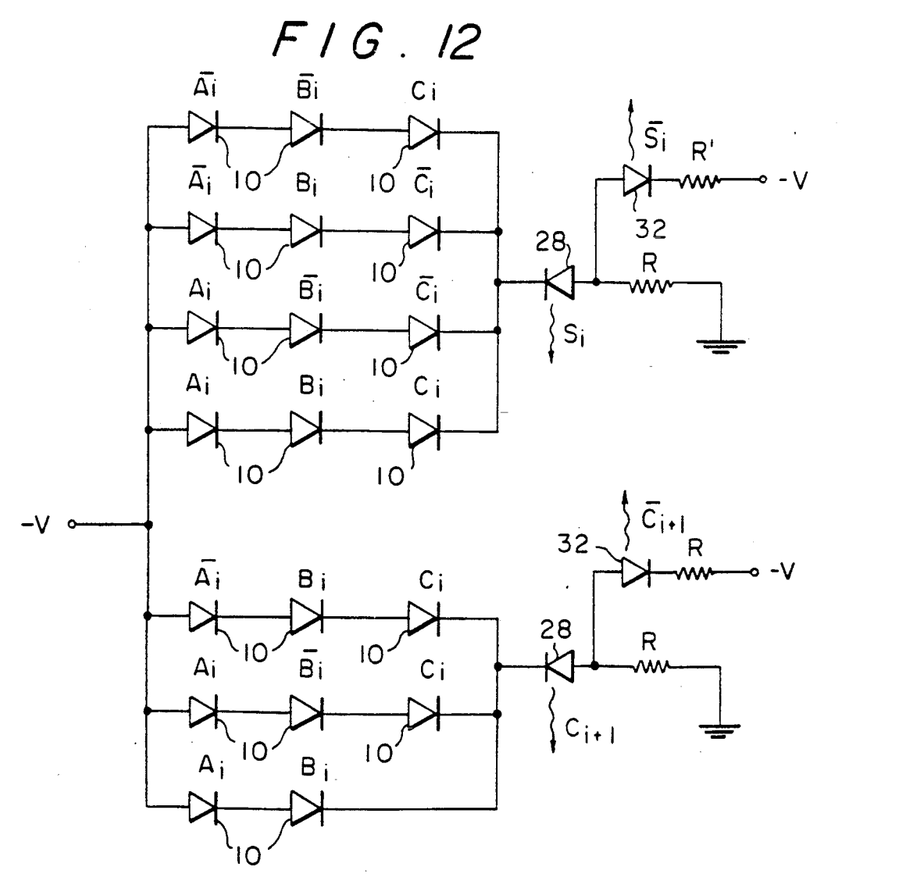
FIG. 12 is a schematic view of a 1 bit full adder according to the present invention.

FIG. 12 shows a one bit full adder realized using the present invention. Here, the bits to be added are Ai and Bi. Ci indicates a carry bit. The result of the addition is the sum Si and the carry forward is indicated by the bit Ci+1. As with the circuits described above, this is a full complementary circuit which outputs the sum Si and its complement as well as the carry bit Ci+1 and its complement. Again, substrates similar to those in FIGS. 9 and 10 can be used to form this circuit. As is apparent from the foregoing, it is a straightforward matter to determine the boolean equation describing this circuit.

Figure 13:
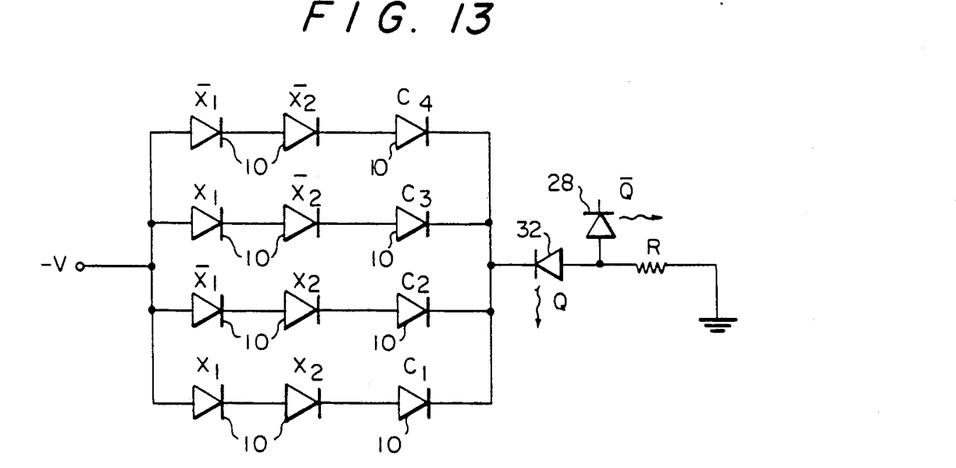
FIG. 13 is a schematic view of a programmable Boolean gate according to the present invention.

FIG. 13 is a schematic representation of the circuit of FIGS. 9 and 10. Here, it can easily be seen that, if there are to be no crossed lines, the actual construction of a circuit must include a separate optical strip for each parameter and its complement. That is, in the schematic diagrams, the parameters and their complements are shown in the same vertical column. Separate columns are needed in the actual physical realization of the circuit, as is apparent by comparing FIG. 13 with FIG. 10.

Figure 14:
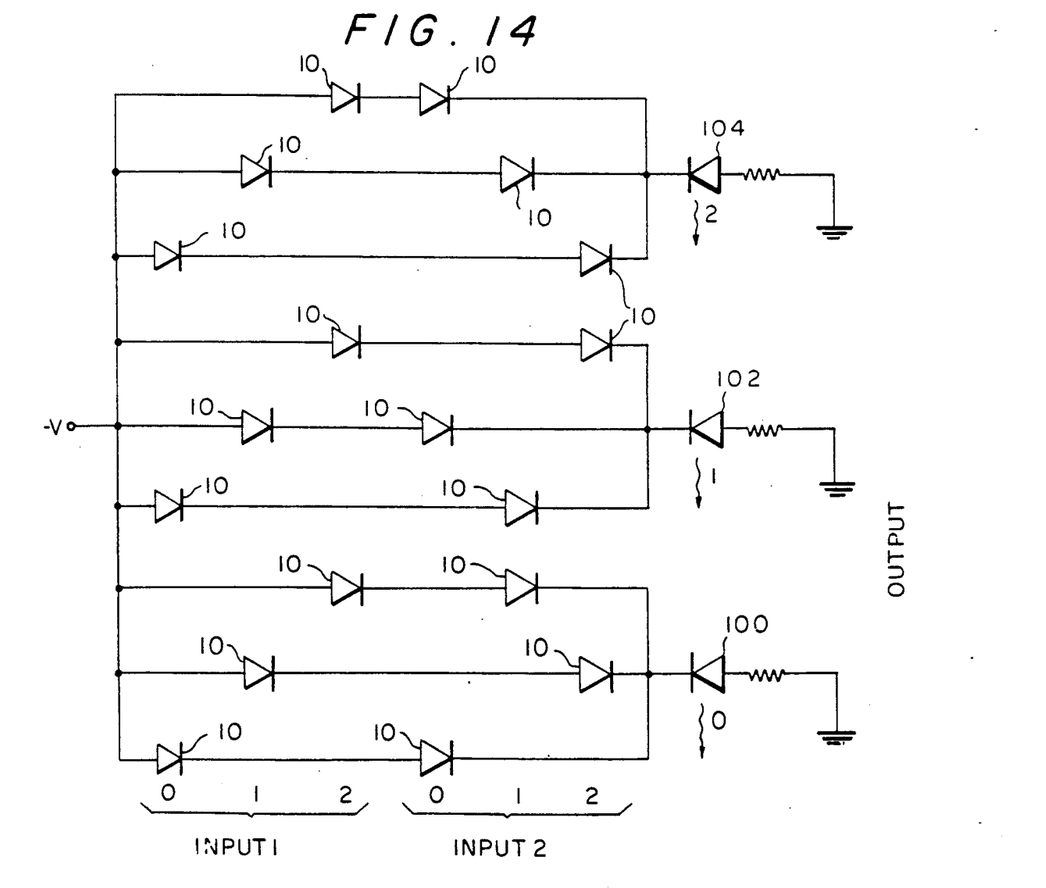
FIG. 14 is a schematic view of a residue 3 adder according to the present invention.

FIG. 14 shows a multiple level logic circuit implemented in accordance with the present invention. The circuit of FIG. 14 is a residue 3 adder. In this circuit, there are two inputs and one output. A one-of-many or positional notation is used.

Residue arithmetic is well known and will not be described in detail here. The two inputs of the adder of FIG. 14 each contain three lines indicated by 0, 1, and 2. These lines indicate the remainder of a number when divided by three. The output from electrical to optical conversions devices 100, 102 and 104 indicates the remainder of the sum of the numbers at inputs one and two after it is divided by 3.

Figure 15:
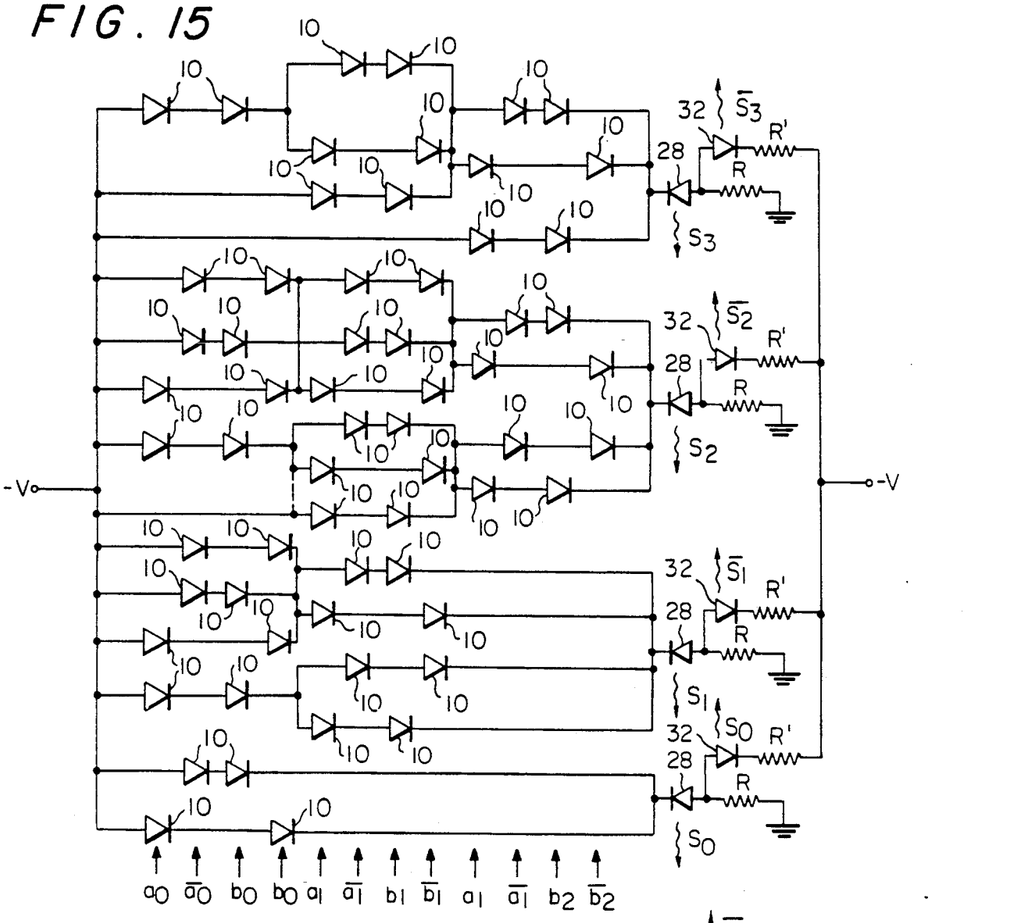
FIG. 15 is a schematic view of a 3 bit full adder according to the present invention.

FIG. 15 is a three bit full adder implemented in accordance with the present invention. The boolean equation for this adder is apparent from the circuit diagram. This adder will have a similar complexity for large bit numbers (32-64) as a residue system having similar range.

Figure 16:
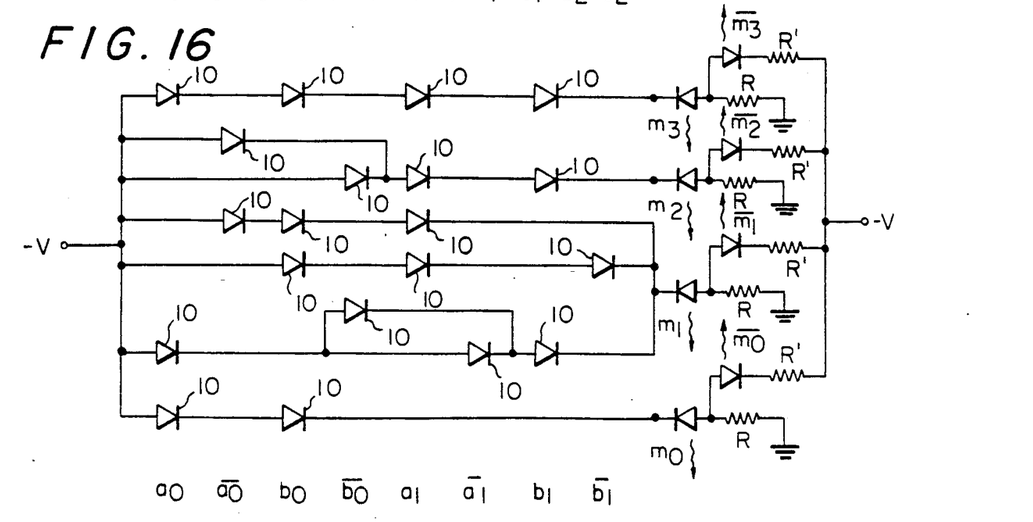
FIG. 16 is a schematic view of a 2 bit multiplier according to the present invention.

FIG. 16 is a two bit binary multiplier. Once again, the boolean equation for this circuit is apparent from the circuit itself and will not be discussed. This type of circuit can be expanded to accommodate larger numbers, but grows very large.

Figure 17:
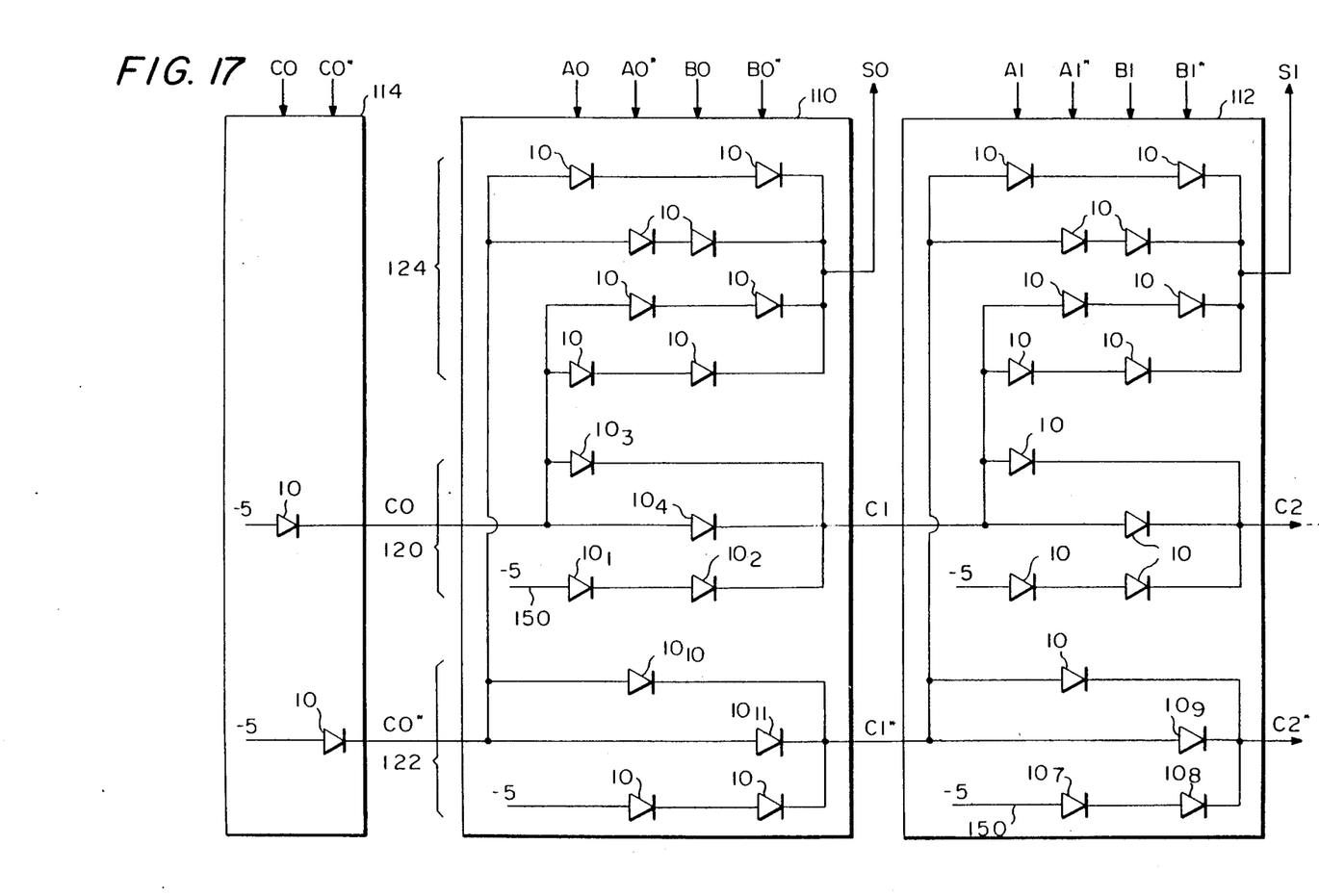
FIG. 17 is a schematic view of a ripple carry adder according to the present invention.

FIG. 17 shows one embodiment of a ripple-carry adder according to the present invention. Ripple carry adders use a number of identical cells which each add two input bits and a carry-in to produce a one-bit result and a carry-out. The carry-out from one cell is propagated to become the carry-in of the next cell. The final result must wait until all of the carries have rippled through the entire adder.

The circuit of FIG. 17 is different from that of FIG. 12 in that all inputs of the FIG. 12 circuit are optical signals and all outputs are converted to optical signals. In the circuit of FIG. 17, on the other hand, the carry signals C0, C1 and C2 as well as their complements C0*, C1* and C2* are not converted to optical signals. They are moved to the next cell as electrical signals. The optoelectronic implementation of the ripple-carry adder in FIG. 17 can produce a result in the equivalent of a one gate-delay.

There are two basic cells 110 and 112 shown in FIG. 17. Each basic cell implements the following logic function:

$$Si = Ai \text{ XOR } Bi \text{ XOR } Ci$$

$$Ci+1 = (Ai\, Bi) + (Ai\, Ci) + (Bi\, Ci)$$

Where:
Si = $i^{th}$ bit of the result; and
Ci = $i^{th}$ carry bit

Using complementary logic requires that these logic equations be restated using only AND and OR logic functions, as follows:

$$Si = (Ai\, Bi\, Ci) + (Ai\, Bi^*\, Ci^*) + (Ai^*\, Bi\, Ci^*) + (Ai^*\, Bi^*\, Ci)$$

$$Ci+1 = (Ai\, Bi) + (Ai\, Ci) + (Bi\, Ci)$$

$$Ci+1^* = (Ai^*\, Bi^*) + (Ai^*\, Ci^*) + (Bi^*\, Ci^*)$$

Any term with an asterisk (*) is the complement of the same term without the asterisk. The A and B terms and their complements are optical while the C term and its complement are electronic, except for the C0 terms. The C* term is obtained by using AND and OR circuits to prevent the introduction of a gate delay associated with an inverter in the logic system.

The basic cells 110 and 112 can be cascaded with other similar cells until the required precision has been reached. This is indicated by the sum and carry signals being outputted from cell 112. Where necessary, an additional cell 114 can be used to convert an optical carry-in signal C0 and its complement C0* to electrical carry and complement signals.

Figure 18:
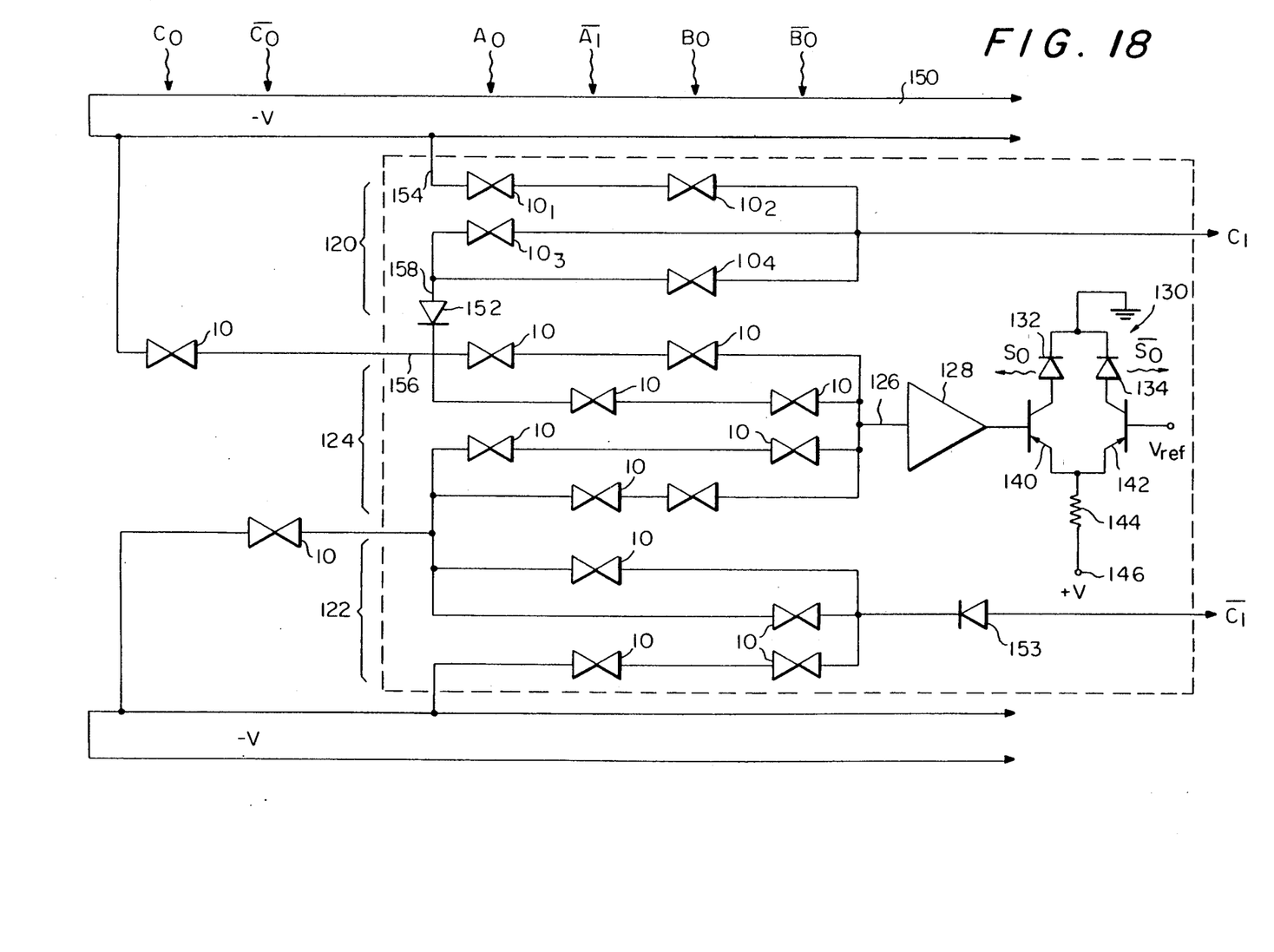
FIG. 18 is a schematic view of a second embodiment of a ripple carry adder according to the present invention in which blocking diodes are used to prevent false signals.

The circuit of FIG. 17 contains crossing wires in each cell. This aspect of the design makes fabrication somewhat difficult and tends to limit performance. Crossing wires require a two step metallization process and slow down the ultimate speed of the device due to crosstalk. This aspect of the invention can be cured by always taking out the sum signal as an optical output and positioning the logic for the sum signal between the logic for the carry signal and the complement of the carry signal. This configuration is shown in FIG. 18 where the carry signal C is generated by logic circuit 120, the carry signal complement C* is generated by the logic circuit 122 and the sum signal S is generated by the logic circuit 124. The electrical output of the sum logic circuit 124 is taken along line 126 and passed through amplifier 128 to the input for a differential amplifier 130 where an optical sum signal S is produced by a first electrical to optical conversion device and the complement of the sum signal is produced by a second electrical to optical conversion device 134. The differential amplifier is a standard design comprising transistors 140 and 142 connected in parallel with their emitters connected to a common current source in the form of resistor 144 and voltage source 146.

Another problem associated with the circuit of FIG. 17 is that there can be a false output in the sum channel when A and B are both on and there is no carry input signal. This is due to the signal at source 150 for the carry logic circuit 120 being fed to the sum logic circuit 124 through the series connected A and B photoconductors $10_1$ and $10_2$ in circuit 120 and back through the parallel A and B photoconductors $10_3$ and $10_4$ in circuit 120, indicating the presence of a carry input even when one is not present.

The false indication problem with the circuit of FIG. 17 can be corrected by adding a blocking diode between carry circuit 120 and sum circuit 124, as shown in FIG. 18. Diode 152 blocks the voltage 150 appearing at the bias input 154 to photoconductor $10_1$ from appearing at the carry input 156 of sum circuit 124, but permits an electrical carry signal to be passed to the carry input 158 of circuit 120.

Another false indication can be produced in the circuit of FIG. 17 due to a signal in a subsequent cell being fed back to a previous cell. Specifically, if the A1 and B1* inputs of cell 112 are on, the signal at source 150 of carry circuit 122 can is fed back through photoconductors $10_7$, $10_8$ and $10_9$ to the carry complement output of cell 110. If at the same time A0* and/or B0* are on, the fed back signal will be fed through photoconductor $10_{10}$ and/or photoconductor $10_{11}$ and appear as a false C0* signal.

The second false indication problem can be solved by adding an additional diode 153 in the carry complement output between each cell and each subsequent cell. This prevents the feedback of erroneous signals.

One problem with the circuit of FIG. 18 is that the diodes 152 and 153 repeat in every adder cell and the sum of diode voltage drops severely limits the number of modules that can be strung together. In order to eliminate this problem, the diodes 152 and 153 must be eliminated.

Figure 19:
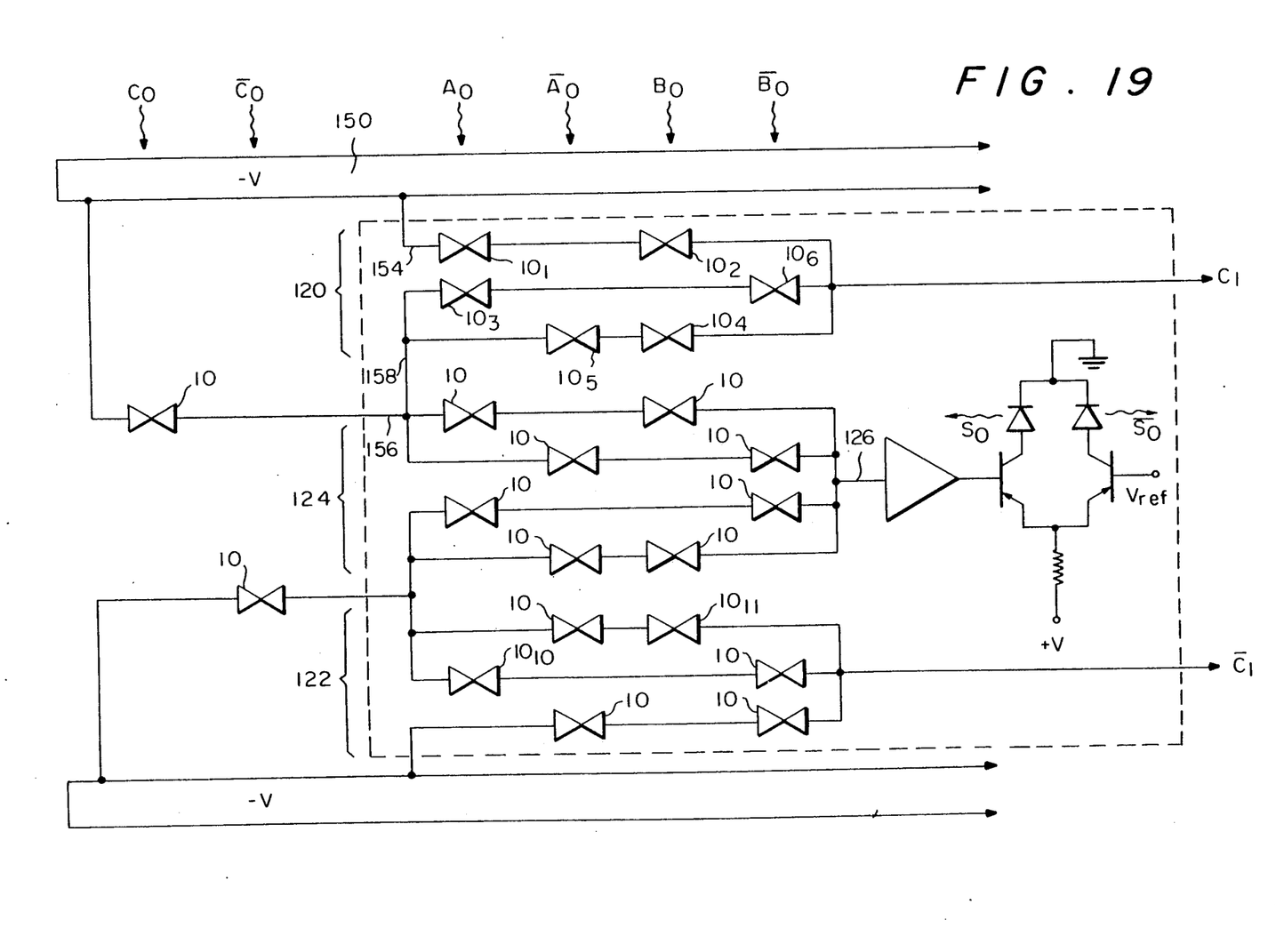
FIG. 19 is a schematic view of a third embodiment of a ripple carry adder according to the present invention in which redundant photoconductive elements are used to prevent false signals.

FIG. 19 shows one solution to the diode problem. The following Boolean identity is used to eliminate diode 152:

$$\begin{aligned} C(A + B) + AB &= C(A(B + B^*) + B(A + A^*)) + AB \\ &= C(AB^* + BA^*) + C(AB + BA) + AB \\ &= C(AB^* + BA^*) + (C + 1)AB \\ &= C(AB^* + BA^*) + AB \end{aligned}$$

As shown in FIG. 19, in place of the diode 152, the circuit 120 designed in accordance with the above identity has one additional photoconductive element $10_5$ representing A* and one addition photoconductive element $10_6$ representing B*. These are placed in series with, respectively, photoconductive elements $10_4$ and $10_3$ in order to block the passage of signals to input 158 in the absence of a carry input signal.

A similar type of analysis can be done to show that diode 153 can be replaced with two photoconductive elements $10_{10}$, representing A0, and $10_{11}$, representing B0. Such a proof would be readily apparent to one skilled in the art given the position of these new photoconductors.

The foregoing description is intended to illustrate the present invention, but not to limit its scope. Clearly, numerous additions, substitutions and other changes could be made to the invention without limiting the scope thereof as set forth in the appended claims.

What is claimed is:

1. An apparatus, comprising:
   a semiconductor substrate;
   element defining means for defining a plurality of photoconductive elements in said semiconductive substrate;
   connecting means for connecting a plurality of said photoconductive elements to form a ripple carry adder comprising a plurality of similar cells each having complementary inputs, a sum output, a carry output and a complementary carry output such that said ripple carry adder comprises only AND and OR gates and light directing means positioned above said semiconductor substrate for directing light representing logic parameters to selected photoconductor elements of said logic gates.

2. An apparatus as claimed in claim 1 wherein said connecting means includes light emitting means for producing an optical output, and wherein said carry and complementary carry outputs are electrical and said sum output is optical.

3. An apparatus as claimed in claim 1 wherein said connecting means includes wires for connecting said photoconductive elements, and wherein said ripple carry adder includes a sum logic circuit, a carry circuit and a complementary carry logic circuit and wherein said sum logic circuit is positioned between said carry logic circuit and said complementary logic circuit to avoid crossing any of said wires.

4. An apparatus as claimed in claim 3 including a common carry-in input for said sum logic circuit and said carry logic circuit and including a blocking diode positioned between said sum logic circuit and said carry logic circuit to prevent signals from said carry logic circuit from producing a false indication in said sum logic circuit.

5. An apparatus as claimed in claim 3 including a common carry-in input for said sum logic circuit and said carry logic circuit and including means for blocking signals from said carry logic circuit from creating false indications in said sum logic circuit.

6. An apparatus as claimed, in claim 5 wherein said signal blocking means comprises redundant photoconductive elements.

7. An apparatus as claimed in claim 1 wherein said element defining means and said connecting means comprise a metallization layer over said semiconductor substrate.

8. An apparatus as claimed in claim 7 wherein said light directing means comprises an optical substrate having a plurality of waveguides over said metallization layer.

9. An apparatus as claimed in claim 8 wherein said waveguides include scattering patches positioned over certain of said photoconductive elements.

10. An apparatus as claimed in claim 1 wherein said element defining means comprises a pair of spaced metal electrodes having interdigitated fingers.

11. An apparatus as claimed in claim 10 wherein said metal electrodes are spaced by a distance of less than 5 microns.

12. An apparatus as claimed in claim 1 wherein said connecting means connects a plurality of said photoconductive elements in series to form an AND gate.

13. An apparatus as claimed in claim 1 wherein said connecting means connects a plurality of said photoconductive elements in parallel to form an OR gate.

14. An apparatus as claimed in claim 1 wherein said light directing means directs a plurality of light rays to selected photoconductive elements to form an OR gate.

15. An apparatus as claimed in claim 1 wherein said complementary outputs include paired light emitting elements.

16. An apparatus as claimed in claim 1 including means for generating complementary light signals to be directed by said light directing means.

17. An apparatus as claimed in claim 16 wherein said means for generating complementary light signals comprises a first electrical to optical signal transducer, a second electrical to optical signal transducer, and means for driving either one or the other of said electrical to optical signal transducers in dependence on an input signal.

18. An apparatus as claimed in claim 17 wherein said means for generating complementary light signals comprises an integrated optic switch.

19. An apparatus as claimed in claim 18 wherein said integrated optic switch is an X-crossing switch.

20. An apparatus as claimed in claim 18 wherein said integrated optic switch is a total internal reflectance (TIR) switch.

21. An apparatus as claimed in claim 18 wherein said means for generating complementary light signals is connected to produce said complementary input signals.

22. An apparatus as claimed in claim 18 wherein said means for generating complementary light signals is connected to produce complementary sum output signals.

23. An apparatus as claimed in claim 1 including means for preventing signals fed back from one cell to a previous cell from causing false indications.

24. An apparatus as claimed in claim 23 wherein said means for preventing comprises a blocking diode positioned between cells.

25. An apparatus as claimed in claim 23 wherein said means includes redundant photoconductive elements.

* * * * *